US011210473B1

(12) United States Patent
Mariko et al.

(10) Patent No.: US 11,210,473 B1
(45) Date of Patent: Dec. 28, 2021

(54) DOMAIN KNOWLEDGE LEARNING TECHNIQUES FOR NATURAL LANGUAGE GENERATION

(71) Applicant: YSEOP SA, Lyons (FR)

(72) Inventors: Dominique Mariko, Paris (FR);
Yagmur Ozturk, Saint Claude (FR);
Hugues Sézille de Mazancourt, Thiais (FR)

(73) Assignee: YSEOP SA, Lyons (FR)

( * ) Notice: Subject to any disclaimer, the term of this patent is extended or adjusted under 35 U.S.C. 154(b) by 103 days.

(21) Appl. No.: 16/816,475

(22) Filed: Mar. 12, 2020

(51) Int. Cl.
*G06F 40/30* (2020.01)
*G06N 3/04* (2006.01)
*G06N 3/08* (2006.01)

(52) U.S. Cl.
CPC .......... *G06F 40/30* (2020.01); *G06N 3/0445* (2013.01); *G06N 3/08* (2013.01)

(58) Field of Classification Search
CPC ......... G06F 40/30; G06N 3/0445; G06N 3/08
See application file for complete search history.

(56) References Cited

U.S. PATENT DOCUMENTS

| | | | | |
|---|---|---|---|---|
| 7,412,385 B2 * | 8/2008 | Brockett | ............... | G06F 40/44 704/245 |
| 7,546,235 B2 * | 6/2009 | Brockett | ............... | G06F 40/45 704/9 |
| 7,552,046 B2 * | 6/2009 | Brockett | ............... | G06F 40/237 704/9 |
| 7,584,092 B2 * | 9/2009 | Brockett | ............... | G06F 40/237 704/9 |
| 8,204,842 B1 * | 6/2012 | Zhang | ............... | G06N 5/02 706/45 |
| 9,135,244 B2 | 9/2015 | Reiter | | |
| 10,339,470 B1 | 7/2019 | Dutta et al. | | |
| 10,943,072 B1 * | 3/2021 | Jaganmohan | ............ | G06N 3/08 |
| 2006/0009966 A1 | 1/2006 | Johnson et al. | | |
| 2006/0245641 A1 | 11/2006 | Viola et al. | | |
| 2007/0055491 A1 | 3/2007 | Manson et al. | | |
| 2009/0287476 A1 | 11/2009 | Johnson et al. | | |

(Continued)

OTHER PUBLICATIONS

Roche et al., Finite-state language processing. MIT press. 1997. 474 pages.

(Continued)

*Primary Examiner* — Kevin Ky
(74) *Attorney, Agent, or Firm* — Wolf, Greenfield & Sacks, P.C.

(57) ABSTRACT

Techniques for identifying vocabulary associated with semantic objects used for generating natural language text with a natural language generation (NLG) system, the semantic objects including a first semantic object having a first set of ordered attributes. The techniques include: obtaining text segments; identifying, from among the text segments and using at least one first machine learning classifier, groups of text segments corresponding to respective semantic objects in the plurality of semantic objects; identifying, from the groups of text segments and using at least one second machine learning classifier, a plurality of vocabularies for the plurality of semantic objects; and generating natural language text using the NLG system, the plurality of vocabularies, and the plurality of semantic objects; and outputting the generated natural language text.

20 Claims, 9 Drawing Sheets

(56) References Cited

U.S. PATENT DOCUMENTS

| | | | |
|---|---|---|---|
| 2011/0184727 | A1 | 7/2011 | Connor |
| 2014/0156264 | A1 | 6/2014 | Etzioni et al. |
| 2014/0188891 | A1 | 7/2014 | Nath et al. |
| 2015/0089409 | A1* | 3/2015 | Asseily .......... G06Q 50/01 715/765 |
| 2015/0169547 | A1 | 6/2015 | Reiter |
| 2016/0364377 | A1* | 12/2016 | Krishnamurthy ....... G06F 40/30 |
| 2017/0357636 | A1* | 12/2017 | Shafiulla ............ G06Q 30/02 |
| 2019/0311039 | A1 | 10/2019 | Plant et al. |
| 2020/0184959 | A1* | 6/2020 | Yasa .................. G10L 15/1815 |
| 2020/0201897 | A1* | 6/2020 | Palanciuc ............ G06F 40/30 |
| 2020/0356732 | A1 | 11/2020 | Salmon et al. |
| 2020/0380075 | A1* | 12/2020 | Boada ................. G06F 40/216 |
| 2020/0410011 | A1* | 12/2020 | Shi .................... G06F 16/24578 |

OTHER PUBLICATIONS

International Search Report and Written Opinion for International Application No. PCT/IB2020/000359 dated Sep. 15, 2020.

Danlos et al., EasyText: an operational NLG system. Proceedings of the 13th European Workshop on Natural Language Generation (ENLG). 2011:139-144. no date available.

Jäger et al., Formal language theory: refining the Chomsky hierarchy. Philosophical Transactions of the Royal Society B: Biological Sciences. Jul. 19, 2012;367(1598):1956-70.

Lafferty et al., Conditional random fields: Probabilistic models for segmenting and labeling sequence data. Proceedings of the Eighteenth International Conference on Machine Learning (ICML). 2001:282-289. no date available.

Oard et al., Implicit feedback for recommender systems. Proceedings of the AAAI workshop on recommender systems. Jul. 27, 1998;83:3 pages.

Reinanda et al., Performance Comparison of Learning to Rank Algorithms for Information Retrieval. 2014 International Conference on Information, Communication Technology and System. 2014:3 pages. https://www.semanticscholar.org/paper/Performance-Comparison-of-Learning-to-Rank-for-Reinanda-Widyantoro/cd12e191d2c2790e5ed60e5186462e6f8027db1f?citingPapersSort=relevance&citingPapersLimit=10&citingPapersOffset=0&year%5B0%5D=&year%5B1%5D=&citedPapersSort=relevance&citedPapersLimit=10&citedPapersOffset=10#paper-header [last accessed Sep. 4, 2020].

Reiter, Has a consensus NL generation architecture appeared, and is it psycholinguistically plausible?. ArXiv preprint cmp-lg/9411032. Nov. 30, 1994:1-9.

Silberztein, Syntactic parsing with NooJ. HAL archives-ouvertes. Jul. 6, 2010:1-14.

Vaswani et al., Attention is all you need. ArXiv preprint arXiv:1706.03762v5. Dec. 6, 2017;5:1-15.

U.S. Appl. No. 16/868,685, filed May 7, 2020, Salmon et al.

U.S. Appl. No. 16/815,205, filed Mar. 11, 2020, Mariko et al.

PCT/IB2020/000359, Sep. 15, 2020, International Search Report and Written Opinion.

* cited by examiner

DOMAIN KNOWLEDGE LEARNING TECHNIQUES FOR NATURAL LANGUAGE GENERATION

FIELD

The techniques described herein relate to the field of automatic generation of natural language text, and more particularly to techniques for identifying vocabulary associated with semantic objects used for generating natural language text with a natural language generation system.

BACKGROUND

Natural language generation (NLG) is the generation of human-language text (i.e., text in a human language) based on information in non-linguistic form. For example, natural language generation techniques may be used to generate a report for a business based on financial data about the business, to generate a textual description of a day of trading of a particular stock based on data indicating the price of the stock throughout the day, to generate a confirmation e-mail for an online purchase made via the Internet based on data describing the purchase, to generate real-time comments about a sporting even using data about the game, or to generate text for a chatbot for communicating with a customer based on data about the customer.

SUMMARY

Some embodiments provide for a method for identifying vocabulary associated with a plurality of semantic objects used for generating natural language text with a natural language generation (NLG) system, the plurality of semantic objects including a first semantic object having a first set of ordered attributes and second semantic object having a second set of ordered attributes, the method comprising: using at least one computer hardware processor to perform: obtaining at least one text corpus comprising a plurality of text segments; identifying, from among the plurality of text segments and using at least one first machine learning classifier, groups of text segments corresponding to respective semantic objects in the plurality of semantic objects, the groups of text segments including a first group of text segments corresponding to the first semantic object and a second group of text segments corresponding to the second semantic object; identifying, from the groups of text segments and using at least one second machine learning classifier, a plurality of vocabularies for the plurality of semantic objects, the identifying comprising: identifying, using the first group of text segments and the at least one second machine learning classifier, a first vocabulary for the first semantic object, the first vocabulary containing multiple alternative words for each of at least some attributes in the first set of ordered attributes; and identifying, using the second group of text segments and the at least one second machine learning classifier, a second vocabulary for the second semantic object, the second vocabulary containing multiple alternative words for each of at least some attributes in the second set of ordered attributes; generating natural language text using the NLG system, the plurality of vocabularies, and the plurality of semantic objects, the generated natural language text comprising a first text segment generated using the first semantic object and containing at least some words in the first vocabulary and a second text segment generated using the second semantic object and containing at least some words in the second vocabulary; and outputting the generated natural language text.

Some embodiments provide for a system, comprising: at least one computer hardware processor; and at least one non-transitory computer-readable storage medium storing processor executable instructions that, when executed by the at least one computer hardware processor, cause the at least one computer hardware processor to perform: a method for identifying vocabulary associated with a plurality of semantic objects used for generating natural language text with a natural language generation (NLG) system, the plurality of semantic objects including a first semantic object having a first set of ordered attributes and second semantic object having a second set of ordered attributes, the method comprising: obtaining at least one text corpus comprising a plurality of text segments; identifying, from among the plurality of text segments and using at least one first machine learning classifier, groups of text segments corresponding to respective semantic objects in the plurality of semantic objects, the groups of text segments including a first group of text segments corresponding to the first semantic object and a second group of text segments corresponding to the second semantic object; identifying, from the groups of text segments and using at least one second machine learning classifier, a plurality of vocabularies for the plurality of semantic objects, the identifying comprising: identifying, using the first group of text segments and the at least one second machine learning classifier, a first vocabulary for the first semantic object, the first vocabulary containing multiple alternative words for each of at least some attributes in the first set of ordered attributes; and identifying, using the second group of text segments and the at least one second machine learning classifier, a second vocabulary for the second semantic object, the second vocabulary containing multiple alternative words for each of at least some attributes in the second set of ordered attributes; generating natural language text using the NLG system, the plurality of vocabularies, and the plurality of semantic objects, the generated natural language text comprising a first text segment generated using the first semantic object and containing at least some words in the first vocabulary and a second text segment generated using the second semantic object and containing at least some words in the second vocabulary; and outputting the generated natural language text.

Some embodiments provide for at least one non-transitory computer-readable storage medium storing processor executable instructions that, when executed by at least one computer hardware processor, cause the at least one computer hardware processor to perform: a method for identifying vocabulary associated with a plurality of semantic objects used for generating natural language text with a natural language generation (NLG) system, the plurality of semantic objects including a first semantic object having a first set of ordered attributes and second semantic object having a second set of ordered attributes, the method comprising: obtaining at least one text corpus comprising a plurality of text segments; identifying, from among the plurality of text segments and using at least one first machine learning classifier, groups of text segments corresponding to respective semantic objects in the plurality of semantic objects, the groups of text segments including a first group of text segments corresponding to the first semantic object and a second group of text segments corresponding to the second semantic object; identifying, from the groups of text segments and using at least one second machine learning classifier, a plurality of vocabularies for the plurality of semantic objects, the identifying comprising: identifying, using the first group of text segments and the at least one second machine learning classifier, a first vocabulary for the first semantic object, the first vocabulary containing multiple alternative words for each of at least some attributes in the first set of ordered attributes; and identifying, using the second group of text segments and the at least one second machine learning classifier, a second vocabulary for the second semantic object, the second vocabulary containing multiple alternative words for each of at least some attributes in the second set of ordered attributes; generating natural language text using the NLG engine, the plurality of vocabularies, and the plurality of semantic objects, the generated natural language text comprising a first text segment generated using the first semantic object and containing at least some words in the first vocabulary and a second text segment generated using the second semantic object and containing at least some words in the second vocabulary; and outputting the generated natural language text.

Some embodiments provide for a method for identifying vocabulary associated with semantic objects used for generating natural language text with a natural language generation (NLG) system, the semantic objects including a first semantic object having a first set of ordered attributes. The method includes obtaining text segments; identifying, from among the text segments and using at least one first machine learning classifier, groups of text segments corresponding to respective semantic objects in the plurality of semantic objects; identifying, from the groups of text segments and using at least one second machine learning classifier, a plurality of vocabularies for the plurality of semantic objects; and generating natural language text using the NLG system, the plurality of vocabularies, and the plurality of semantic objects; and outputting the generated natural language text.

Some embodiments provide for a system, comprising: at least one computer hardware processor; and at least one non-transitory computer-readable storage medium storing processor executable instructions that, when executed by the at least one computer hardware processor, cause the at least one computer hardware processor to perform a method for identifying vocabulary associated with semantic objects used for generating natural language text with a natural language generation (NLG) system, the semantic objects including a first semantic object having a first set of ordered attributes. The method includes obtaining text segments; identifying, from among the text segments and using at least one first machine learning classifier, groups of text segments corresponding to respective semantic objects in the plurality of semantic objects; identifying, from the groups of text segments and using at least one second machine learning classifier, a plurality of vocabularies for the plurality of semantic objects; and generating natural language text using the NLG system, the plurality of vocabularies, and the plurality of semantic objects; and outputting the generated natural language text.

Some embodiments provide for at least one non-transitory computer-readable storage medium storing processor executable instructions that, when executed by at least one computer hardware processor, cause the at least one computer hardware processor to perform: a method for identifying vocabulary associated with semantic objects used for generating natural language text with a natural language generation (NLG) system, the semantic objects including a first semantic object having a first set of ordered attributes. The method includes obtaining text segments; identifying, from among the text segments and using at least one first machine learning classifier, groups of text segments corresponding to respective semantic objects in the plurality of semantic objects; identifying, from the groups of text segments and using at least one second machine learning classifier, a plurality of vocabularies for the plurality of semantic objects; and generating natural language text using the NLG system, the plurality of vocabularies, and the plurality of semantic objects; and outputting the generated natural language text.

The foregoing is a non-limiting summary of the invention, which is defined by the attached claims.

BRIEF DESCRIPTION OF DRAWINGS

Various aspects and embodiments of the disclosure provided herein are described below with reference to the following figures. The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
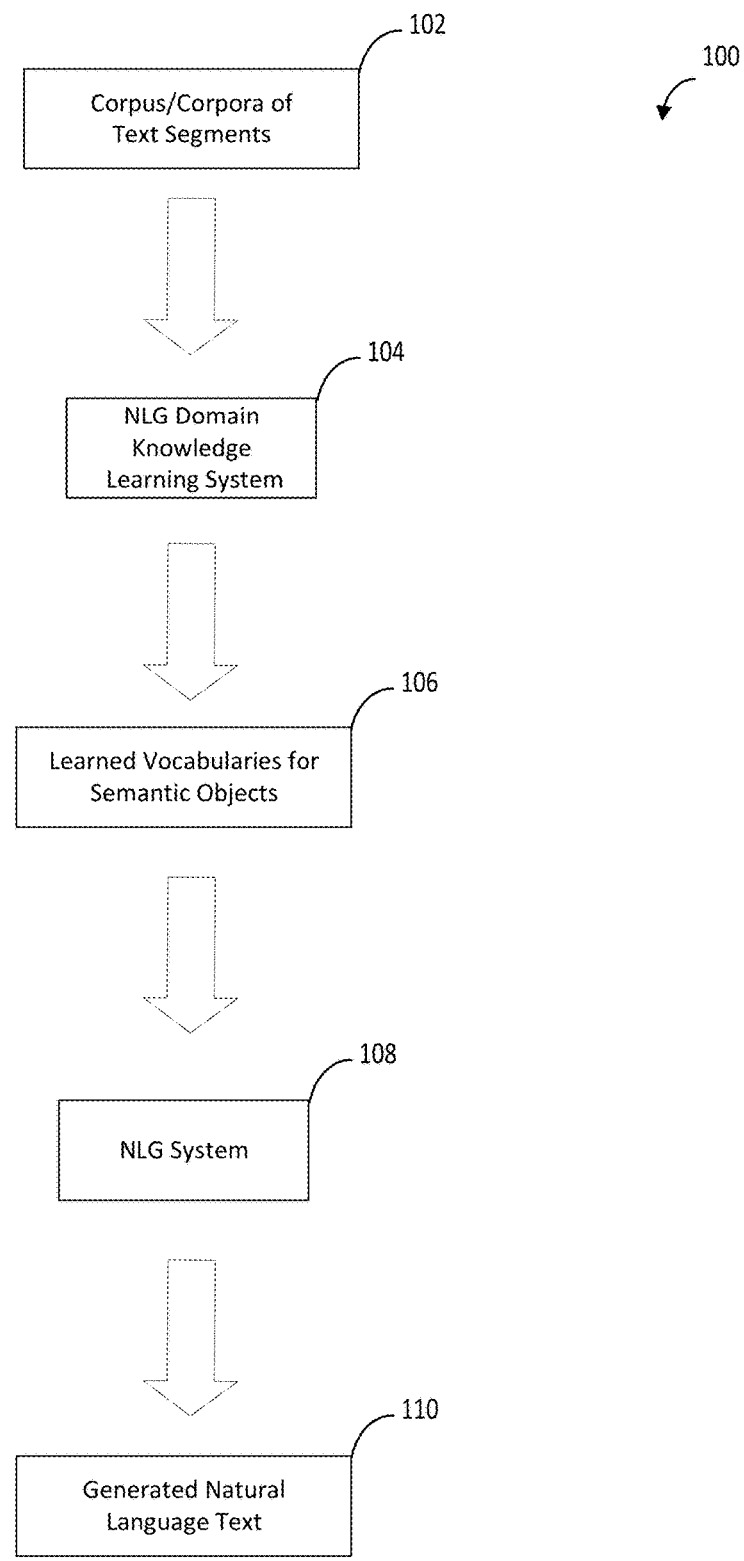
FIG. 1A is a diagram of an illustrative workflow 100 of identifying a respective vocabulary for each of one or more semantic objects and generating natural language text using the identified vocabularies, in accordance with some embodiments of the technology described herein.

The inventors have appreciated that users of natural language generation (NLG) systems would benefit from having such systems generate natural language customized to the domain of application. For example, a business may use an NLG system to generate reports or e-mails and may desire to have the NLG system generate such reports or e-mails using terminology and sentence structure consistent with the terminology and sentence structure already being used by the business. For example, companies in one industry (e.g., airline industry) and companies in another industry (e.g., banking industry) may use different terminology and sentence structure to generate reports. As a result, for many applications, it is desirable to adapt an NLG system to a particular industry or a business.

However, conventional approaches to customizing NLG systems to a specific application domain (e.g., generating documents for a particular company) are predominately manual as they involve hiring people to review documents used by a company and manually generating templates to use for generating various types of documents (e.g., different templates for different types of reports, different templates for different types of e-mails, etc.). Not only do such approaches fail to scale when an NLG system is to be deployed at different companies, but they cannot even practically applied to customizing an NLG system to generating different types of documents within the same company—manual customization takes too much time and is too expensive. Moreover, a person can only review a limited number of documents when generating a template, rather than all available documents (which may be in the hundreds of thousands) and, as a result, the customization is not as high quality or as granular needed. Manual results are error prone, and results produced by different people are inconsistent.

To address some of these shortcomings of conventional approaches to customizing NLG systems to a particular domain, the inventors have developed automated machine learning techniques to customize NLG systems to a domain. The techniques are able to rapidly customize an NLG system by automated analysis of tens or hundreds of thousands of documents for a domain allowing for the customization to be deployed for different types of documents within a business and across different businesses. The techniques involve using semantic objects defined for the domain to identify vocabularies to use when generating natural language text using the semantic objects.

In some embodiments, a semantic object specifies content to be included in a natural language segment (e.g., a sentence) and the order in which such content is to appear. In some embodiments, the order of content is specified by a syntax grammar. For example, in some embodiments, a semantic object includes a plurality of attributes, each of which may be substituted by one or more words from an associated vocabulary when the semantic object is rendered into natural language text by an NLG system. In some such embodiments, the semantic object may include a syntax grammar, which may specify the attributes and an order among the attributes. Although it should be appreciated that other types of syntax grammars may be used, in some embodiments. Examples of semantic objects are provided herein including with reference to the example semantic objects 200 and 220 illustrated in FIGS. 2A and 2B.

The machine learning techniques developed by the inventors enable automated and rapid identification of vocabulary, from one or more corpora of documents for the domain, to be used in generating natural language text using syntax grammars for the domain.

In some embodiments, the machine learning techniques developed by the inventors involve a two-stage process: (1) a first stage in which text segments from documents for the domain are processed using at least one machine learning classifier to identify groups of text segments, with each group being associated with a respective syntax grammar (e.g., a semantic object); and (2) a second stage in which text segment groups are processed using at least one second machine learning classifier to associate words in the text segments with elements of the syntax grammars (e.g., semantic object attributes). In turn, the association between words and syntax grammar elements may be used to identify vocabularies to use for generating, using the syntax grammars, natural language text customized to the domain.

Accordingly, some embodiments provide for techniques for identifying vocabulary associated with a plurality of semantic objects used for generating natural language text with a natural language generation (NLG) system, the plurality of semantic objects including a first semantic object having a first set of ordered attributes and second semantic object having a second set of ordered attributes. The techniques include: (1) obtaining at least one text corpus (e.g., a collection of documents in a particular domain) comprising text segments (e.g., multi-word phrases, sentences, paragraphs, etc.); (2) identifying, from among the text segments and using at least one first machine learning classifier (e.g., a recurrent neural network classifier), groups of text segments corresponding to respective semantic objects in the plurality of semantic objects, the groups of text segments including a first group of text segments corresponding to the first semantic object and a second group of text segments corresponding to the second semantic object; (3) identifying, from the groups of text segments and using at least one second machine learning classifier (e.g., at least one conditional random field classifier), a plurality of vocabularies for the plurality of semantic objects, the identifying comprising: (3a) identifying, using the first group of text segments and the at least one second machine learning classifier, a first vocabulary for the first semantic object, the first vocabulary containing multiple alternative words for each of at least some attributes in the first set of ordered attributes; and (3b) identifying, using the second group of text segments and the at least one second machine learning classifier, a second vocabulary for the second semantic object, the second vocabulary containing multiple alternative words for each of at least some attributes in the second set of ordered attributes.

In some embodiments, the identified vocabularies may be used to generate natural language text consistent with the semantic objects for which the vocabularies were identified. In some such embodiments, the techniques may further include: (4) generating natural language text using the NLG system, the plurality of vocabularies, and the plurality of semantic objects, the generated natural language text comprising a first text segment generated using the first semantic object and containing at least some words in the first vocabulary and a second text segment generated using the second semantic object and containing at least some words in the second vocabulary; and (5) outputting the generated natural language text.

Additionally or alternatively, in some embodiments, the identified vocabularies may be stored for subsequent use. For example, the identified vocabularies may be stored in a database or any other suitable computer-readable storage medium, and subsequently accessed for use in generating natural language consistent with the semantic objects for which the vocabularies were identified. The identified vocabularies may be stored together with information associating the plurality of vocabularies with the plurality of semantic objects.

In some embodiments, the at least one text corpus may include a large number of text segments (e.g., multi-word phrases or sentences). For example, in some embodiments, the at least one text corpus may include at least 10,000 text segments, at least 25,000 text segments, at least 50,000 text segments, at least 100,000 text segments, at least 250,000 text segments, at least 500,000 text segments, at least 1 million text segments, between 10,000 and 50,000 text segments, between 50,000 and 100,000 text segments, between 75,000 and 250,000 text segments, between 50,000 and 500,000 text segments, between 250,000 and 1 million text segments, between 500,000 and 1,500,000 text segments, between 1 and 10 million text segments, or any suitable number or range of text segments within these ranges.

It is simply not feasible to manually process such a large of text segments. Yet, these data should be processed in order to suitably customize an NLG system to a domain. The machine learning techniques developed by the inventors make possible the automated processing of all such text segments. In particular, the first and second machine learning classifiers are used to efficiently process large number of text segments to identify vocabularies for corresponding semantic objects, in accordance with some embodiments of the technology described herein. In this way, the technology described herein provides an improvement to conventional NLG systems—the machine learning technology developed by the inventor allows for efficient customization of NLG systems, simplifies their deployment to different environments, and results in the generation of higher quality natural language text, which is important in many practical applications.

In some embodiments, the at least one first machine learning classifier may be used to distinguish among text segments that correspond to one of the plurality of semantic objects and text segments that do not correspond to any of the plurality of semantic objects. In this way, text segments that do not correspond to any semantic objects are not used to learn vocabulary for generating natural language text based on the semantic objects. Such text segments may be discarded, in some embodiments, and not used to customize an NLG system.

In some embodiments, the at least one first machine learning classifier may be a single machine learning classifier. For example, the first machine learning classifier may be a multi-class classifier configured to associate an input text segment with one of multiple output classes. The association may be a hard association (the output of the first machine learning classifier may be a single class) or a soft association (the output may be a set of values indicating likelihoods or probabilities that the input is associated with various output classes). In some embodiments, the multiple output classes may include an output class for each of the plurality of semantic objects. The multiple output classes may further include an output class into which text segments classifier as not being associated with any semantic object are classified (effectively, a class representing "noise" in this problem.).

In some embodiments, the at least one first machine learning classifier may include multiple classifiers working together to classify input text segments as being associated with one of the semantic objects or with noise. For example, the at least one first machine learning classifier may include a two-class classifier (or a one-class classifier) to separate text segments that correspond to some semantic object from the semantic objects that do not correspond to any semantic object. A further classifier or classifiers may then be applied to the text segments that correspond to some semantic object in order to determine which specific semantic object to associate with each text segment.

The at least one first machine learning classifier may include a classifier of any suitable type. In some embodiments, the at least one first machine learning classifier may include a neural network classifier. The neural network classifier may be a recurrent neural network classifier such as a long short-term memory (LSTM) neural network classifier (e.g., a bi-directional LSTM neural network classifier). As another example, the at least one first machine learning classifier may include a hidden Markov model classifier, a naïve Bayes classifier, a support vector machine classifier, and/or a logistic regression classifier.

As described herein, the at least one second machine learning classifier may be used to identify vocabularies for different semantic objects from input text segments. In some embodiments, the at least one second machine learning classifier may include multiple classifiers, each of which is used to identify vocabularies for a respective semantic object from input text segments associated (e.g., by using the at least one first machine learning classifier) with the respective semantic object. For example, the at least one second machine learning classifier may include multiple conditional random field (CRF) classifiers, with each of the CRF classifiers used to identify vocabularies for a respective semantic object from input text segments associated (e.g., by using the at least one first machine learning classifier) with the respective semantic object. However, it should be appreciated that in some embodiments, the at least one second machine learning classifier may consist of a single machine learning classifier trained to identify vocabularies for multiple semantic objects from input text segments associated with the multiple semantic objects, as aspects of the technology described herein are not limited in this respect.

In some embodiments, a particular ML classifier used to identify a vocabulary for a particular semantic object may be configured to associate words in input text segments with attributes of the particular semantic object. In such embodiments, the output classes of the particular ML classifier may correspond to attributes of the particular semantic object. In some such embodiments, an input text segment may be processed by, for each of one or more words in the input text segment: (1) generating a set of features; (2) providing the set of features as input to the particular ML classifier to obtain a corresponding output; and (3) determining whether the word is associated with any attributes of a semantic object based on the corresponding output. In this way, the particular ML classifier may be used to tag words in a text segment with semantic object attributes. After the particular ML classifier is applied to multiple text segments, the words from the text segments that are associated by the particular ML classifier with the particular semantic object may be part of the vocabulary for the particular semantic object. In turn, the vocabulary may be used by an NLG system to generate natural language text consistent with the particular semantic object. Accordingly, in some embodiments, the first group of text segments comprises a first text segment, and identifying the first vocabulary comprises: (1) determining a first set of feature values for the first text segment; and (2) providing the first set of feature values as input to the second machine learning classifier to obtain a corresponding output, with the corresponding output identifying, for each of at least some of the words in the first text segment, at least one corresponding attribute in the first set of ordered attributes.

In some embodiments, the at least one second machine classifier comprises a third ML classifier and a fourth ML classifier, the first group of text segments comprises a first text segment, and the second group of text segments comprises a second text segment. Identifying the first vocabulary comprises: (1) determining a first set of feature values for the first text segment; and (2) providing the first set of feature values as input to the third ML classifier to obtain a first output that identifies, for each of at least some of the words in the first text segment, at least one corresponding attribute in the first set of ordered attributes. Identifying the second vocabulary comprises: (3) determining a second set of feature values for the second text segment; and (4) providing the second set of feature values as input to the fourth ML classifier to obtain a second output that identifies, for each of at least some of the words in the second text segment, at least one corresponding attribute in the second set of ordered attributes.

The second machine learning classifier may be of any suitable type. In some embodiments, the second machine learning classifier may be a conditional random field (CRF) classifier, a graphical model classifier, a Markov random field classifier, a neural network classifier, a decision tree classifier, a random forest classifier, a support vector machine classifier, or any other suitable type of classifier, as aspects of the technology described herein are not limited in this respect.

In some embodiments, the first set of feature values include, for each word of one or more words in the first text segment, feature values for features selected from the group consisting of: the word in lowercase, the word without its last three characters, the word without its last two characters, an indication if each letter in the word is capitalized, an indication of whether only the first letter is capitalized, an indication of whether the word is a digit or a number, and information specifying the part of speech (POS) for the word.

In some embodiments, the first of ordered attributes includes attributes selected from the group consisting of: an owner attribute, an entity attribute, a value attribute, a modifier attribute, a specific predicate attribute, a variation orientation attribute, a duration attribute, a contributor attribute, a reference attribute, and a contribution attribute.

In some embodiments, the first vocabulary further includes information specifying at least one frequency of occurrence of at least one of the multiple alternative words in the first group of text segments.

Following below are more detailed descriptions of various concepts related to, and embodiments of machine learning techniques for determining therapeutic agent dosages. Various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein. FIG. 1A is a diagram of an illustrative workflow 100 for identifying a respective vocabulary for each of one or more semantic objects and generating natural language text using the identified vocabularies, in accordance with some embodiments of the technology described herein. The workflow 100 may be performed using one or multiple computing devices, as aspects of the technology described herein are not limited in this respect. For example, in some embodiments, some parts of workflow 100 may be performed by an NLG Domain Knowledge Learning System (DKLS) (e.g., NLG DKLS 104) and other parts of workflow 100 may be performed by an NLG system (e.g., NLG system 108) different from the NLG Domain Knowledge Learning System. Though, in other embodiments, the workflow 100 may be performed by a single NLG system (e.g., NLG system 108), as aspects of the technology described herein are not limited in this respect.

As shown in FIG. 1A, the workflow 100 begins when one or multiple text corpora of text segments 102 is provided as input to NLG DKLS 104, which learns vocabularies for semantic objects 106 from the text segments 102. In turn, the learned vocabularies for semantic objects 106 are provided to NLG system 108, which may be configured to use the learned vocabularies 106 to generate natural language text 110. Aspects of workflow 100 are described further herein including with reference to FIGS. 1B, 1C, and 1D.

Figure 1B:
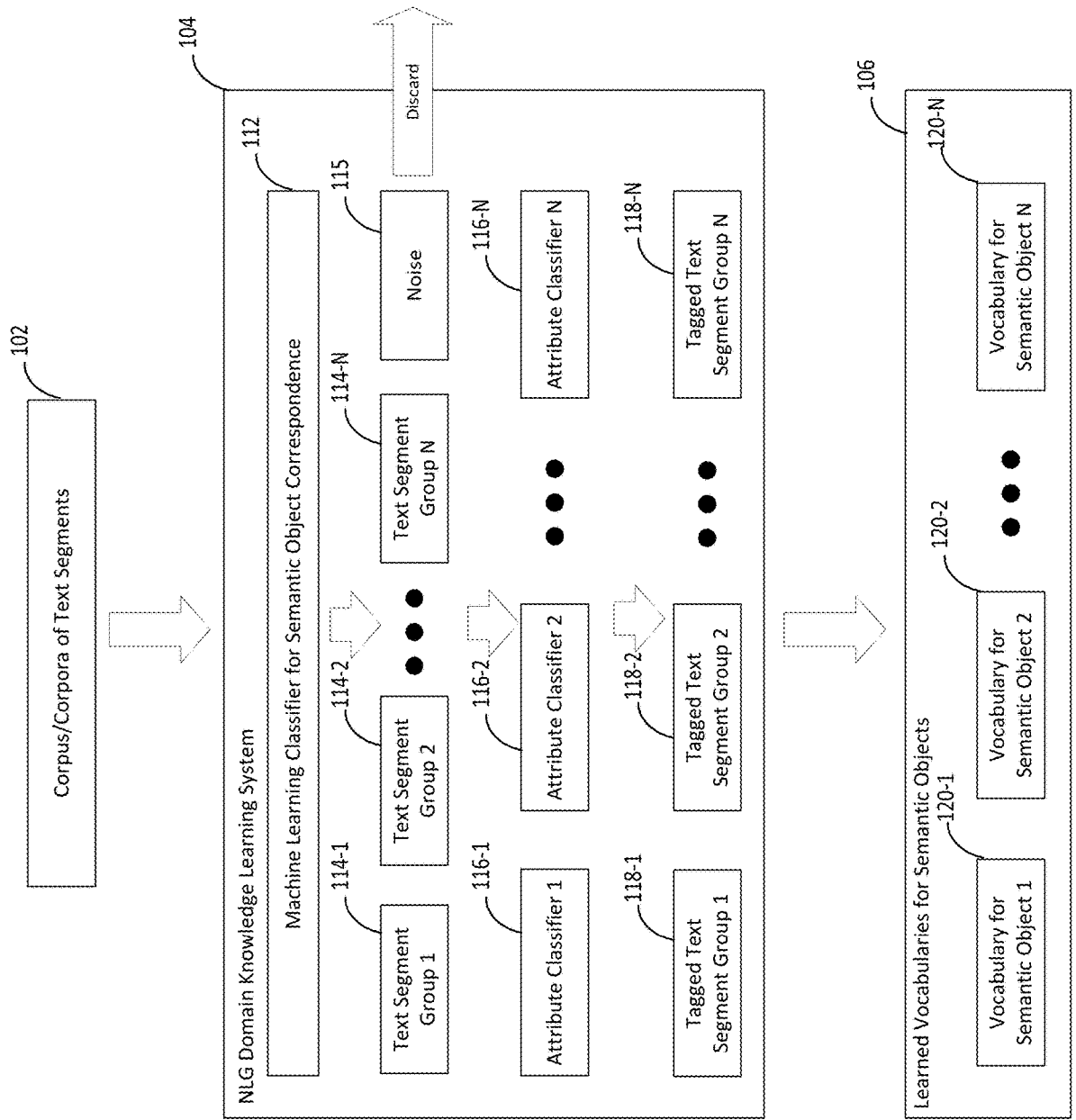
FIG. 1B is a diagram of example components of an illustrative natural language generation (NLG) domain knowledge learning system 104, in accordance with some embodiments of the technology described herein.

FIG. 1B is a diagram of example components of an illustrative natural language generation (NLG) domain knowledge learning system 104, in accordance with some embodiments of the technology described herein.

The one or more corpora of text segments 102 provided as input to NLG DKLS 104 may include any suitable number of text segments, examples of which are provided herein. In some embodiments, the text segments 102 may be obtained from documents in a particular domain. For example, when the NLG DKLS 104 is being used to learn semantic object vocabularies to use for generating natural language text (e.g., reports, documents, e-mails, chatbot conversations, or any other suitable NLG text) for use in a particular industry, the text segments 102 may be obtained from reports and/or any other suitable documents generated by one or more businesses in the particular industry (e.g., banking industry, airline industry, e-commerce industry, etc.). As another example, when the NLG DKLS 104 is being used to learning semantic object vocabularies to use for generating natural language text for use by a particular business (e.g., a particular bank, a particular airline, a particular e-commerce company, etc.), the text segments 102 may be obtained from reports and/or any other suitable documents generated by the particular business. As a specific illustrative example, when the NLG DKLS 104 is being used to learn semantic object vocabularies for generating natural language text in the financial domain, the text segments 102 may include sentences from Securities and Exchange Commission Edgar Database (see e.g., https://www.sec.gov/edgar/search-and-access).

As shown in FIG. 1B, NLG DKLS 104 implements a two-stage classification system with the first stage utilizing at least one first ML classifier (ML classifier 112, in this example) to group text segments into groups corresponding to respective semantic objects and the second stage using at least one second ML classifier (attribute classifiers 116-1, 116-2, . . . , 116-N, in this example) to associate words in the text segments with semantic object attributes.

In the example of FIG. 1B, the ML classifier 112 is configured to classify each of one or more of the text segments as corresponding to one of multiple semantic objects (and, if so, which one) or as not corresponding to any of the multiple semantic objects. For example, as shown in FIG. 1B, applying ML classifier 112 to text segments 102 produces text segment groups 114-1, 114-2, . . . , 114-N, and 115. The text segments in group 114-1 are those text segments (of text segments 102) that were classified by ML classifier 112 as corresponding to semantic object 1. The text segments in group 114-2 are those text segments (of text segments 102) that were classified by ML classifier 112 as corresponding to semantic object 2. The text segments in group 114-N are those text segments (of text segments 102) that were classified by ML classifier 112 as corresponding to semantic object N. The text segments in group 115 are those text segments (of text segments 102) that were classified by ML classifier 112 as not corresponding to any semantic object. Such text segments may be discarded and not used for learning vocabularies for semantic objects 106 in the illustrative workflow 100.

The ML classifier 112 may be of any suitable type. In some embodiments, ML classifier 112 may be a neural network classifier, for example, a recurrent neural network (RNN) classifier. The RNN classifier may be an LSTM classifier (e.g., a bi-directional LSTM classifier). In some embodiments, the ML classifier 112 may be a hidden Markov model classifier, a naïve Bayes classifier, a support vector machine (SVM) classifier, a logistic regression classifier, and/or any other suitable machine learning classifier trained to classify text segments as corresponding to particular semantic objects.

Next, the text segment groups 114-1, 114-2, . . . , 114-N are processed using respective attribute classifiers 116-1, 116-2, . . . , 116-N to produce respective tagged text segment groups 118-1, 118-2, . . . , 118-N. An attribute classifier may be configured to, for each one or more words in a text segment, associate the word with an attribute of a semantic object. For example, attribute classifier 116-1 may be configured to identify, for a particular word in a text segment (part of text segment group 1 which has text segments classified by ML classifier 112 as corresponding to semantic object 1) corresponds to one of the attributes of semantic object 1. Applying attribute classifier 116-1 to a text segment may involve, for each of one or more words in the text segment: (1) generating a set of features for the word; (2) providing the set of features as input to the attribute classifier 116-2 to produce corresponding output, which may identify the attribute of semantic object 1 to which the word corresponds.

Each attribute classifier may be of any suitable type. For example, an attribute classifier may be a conditional random field (CRF) classifier, a graphical model classifier, a Markov random field classifier, a neural network classifier, a decision tree classifier, a random forest classifier, a support vector machine classifier, or any other suitable type of classifier trained to classify words as corresponding to attributes of semantic objects.

Next, the tagged text segment groups 118-1, 118-2, . . . , 118-N may be used to identify vocabularies for semantic objects 120-1, 120-2, . . . , 120-N. In some embodiments, the identification may be performed based on the tags generated by the attribute classifiers. For example, suppose semantic object 1 has three attributes: A1, A2, and A3. Then the vocabulary for semantic object 1 may include three sets of words: a first set of words in text segments of tagged text segment group 118-1 that were tagged by classifier 116-1 as corresponding to attribute A1, a second set of words in text segments of group 118-1 that were tagged by classifier 116-1 as corresponding to attribute A2, and a third set of words in text segments of group 118-1 that were tagged by classifier 116-1 as corresponding to attribute A3. As another example, suppose semantic object 2 has two attributes: B1 and B2. Then the vocabulary for semantic object 2 may include two sets of words: a first set of words in text segments of group 118-2 that were tagged by classifier 116-2 as corresponding to attribute B1, and a second set of words in text segments of group 118-2 that were tagged by classifier 116-2 as corresponding to attribute B2. The words in vocabularies 120-1, 120-2, . . . , 120-N may be organized in any suitable way, using any suitable data structure(s), and in any suitable format, as aspects of the technology described herein are not limited in this respect.

In some embodiments, the vocabulary identified by NLG DKLS 104 may be ranked. For example, in some embodiments, the NLG DKLS 104 may determine a frequency of occurrence (or any other suitable numerical statistic such as TF-IDF) for each of at least one or more vocabulary words identified. This information may also be used by the NLG system 108 when generating NLG text by rendering semantic objects into sentences (e.g., by selecting from among multiple alternative vocabulary words to substitute for a semantic object attribute in accordance with a probability proportion to the frequency of occurrence or other numerical statistic associated with the alternative vocabulary words). An example of occurrence frequencies is shown in FIG. 4B.

The processing performed by NLG DKLS 104 may be performed for any suitable number N of semantic objects, as aspects of the technology described herein are not limited in this respect. For example, the processing may be performed for one, two, three, five, at least ten, at least twenty, at least fifty, or at least 100 semantic objects, any number of semantic objects between 2 and 10, between 5 and 25, between 10 and 50 semantic objects, between 50 and 500 semantic objects, or any other suitable number or range of numbers of semantic objects within these ranges.

Figure 2A:
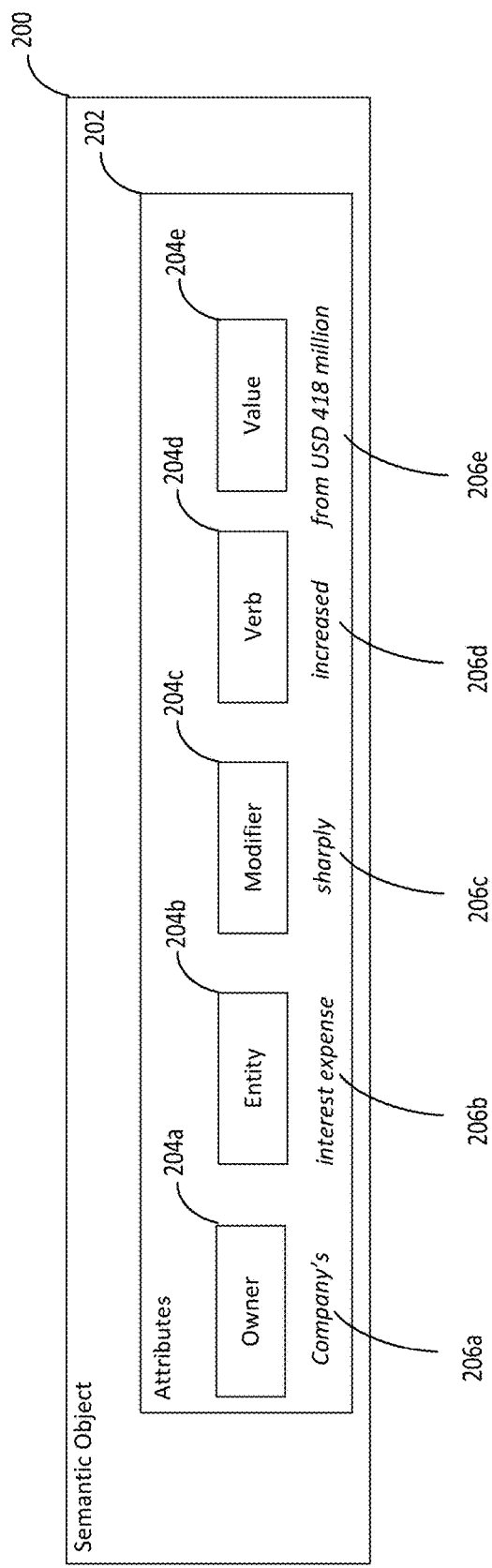
FIG. 2A is a diagram of an illustrative semantic object, in accordance with some embodiments of the technology described herein.
Figure 2B:
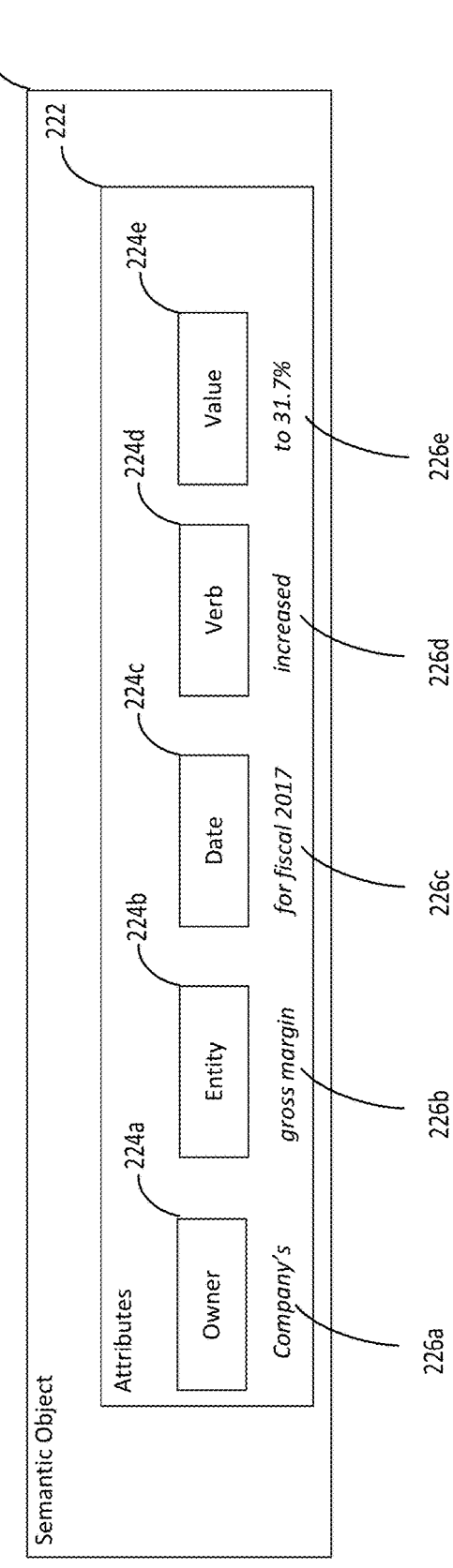
FIG. 2B is a diagram of another illustrative semantic object, in accordance with some embodiments of the technology described herein.

Next, we describe the example semantic objects of FIGS. 2A and 2B so that we can provide specific examples of the type of processing that may be performed by NLG DKLS 104. As described herein, a semantic object may include syntax grammar. In some embodiments, the syntax grammar may specify a list of attributes and an ordering among the attributes. For each attribute, the syntax grammar may indicate whether the attribute is required or optional. Additionally, in some embodiments, the syntax grammar may further specify certain attributes which are forbidden such that if a text segment includes the value an attribute "forbidden" for a semantic object, the text segment will be considered to not correspond to that semantic object.

For example, as shown in FIG. 2A, semantic object 200 includes attributes 202 having the following five attributes: an "owner" attribute 204a, an "entity" attribute 204b, a "modifier" attribute 204c, a "verb" attribute 204d, and a "value" attribute 204e in that order. A value of the "owner" attribute 204a may be one or multiple words specifying a business entity (e.g., a company, a subsidiary, etc.) to which the "entity" relates. For example, the "owner" attribute 204a may take on the value "Company's" 206a or any other suitable value. A value of the "entity" attribute 204b may be one or multiple words describing a financial indicator and/or a measurable quantity about a business. For example, the "entity" attribute 204b may take on the value "interest expense" 206b or "gross margin" or "price to earnings ratio" or any other suitable value. A value of the "modifier" attribute 204c may be one or multiple words describing an adjective or an adverb. For example, the "modifier" attribute 204c may take on the value "sharply" 206c or "slowly" or any other suitable value. A value of the "verb" attribute 204d may be any suitable verb. For example, the "verb" attribute 204d may take on the value "increased" 206d or "decreased" or "changed" or any other suitable verb. A value of the of the "value" attribute 204e may be one or multiple words and/or numbers indicating a measurement of the "entity". For example, the "value" attribute 204e may take on the value "from USD 418 million" 206e or any other suitable value. The sentences "Company's interest expense sharply increased from USD 418 million" and "Company's net profit substantially exceeded 100 million USD" are examples of text segments that conform to the definition of semantic object 200 because they contain values for the attributes 202 of semantic object 200 and in the same order as specified by semantic object 200.

As another example, as shown in FIG. 2B, the semantic object 220 includes attributes 222 having the following five attributes: an "owner" attribute 224a, an "entity" attribute 224b, a "date" attribute 224c (which may take on values of a calendar date), a "verb" attribute 224d, and a "value" attribute" 224e in that order. The sentence "Company's gross margin for fiscal 2017 increased to 31.7%" is an example of a text segment that conforms to the definition of semantic object 220 because it contains values 226a-e for the attributes 224a-e of semantic object 220 and in the same order as specified by the semantic object 220.

As described above, ML classifier 112 is configured to classify text segments as either corresponding to one of multiple possible semantic objects or as not corresponding to any of them. In some embodiments, the ML classifier 112 is trained to classify a text segment as corresponding to a particular semantic object when the text segment contains values of attributes part of the particular semantic object and when those values are ordered in the same order as specified by the particular semantic object. For example, if semantic objects 200 and 220 were among the multiple possible semantic objects, then ML classifier 112 may be trained to classify the text segment "Company's interest expense sharply increased from USD 418 million" as corresponding to semantic object 200 (rather than semantic object 220). As another example, if semantic objects 200 and 220 were among the possible semantic objects, then ML classifier 112 may be trained to classify the text segment "Company's net profit for 2018 decreased by $50 million" as corresponding to semantic object 220 (rather than semantic object 220).

Suppose also for illustration purposes, that semantic object 1 of FIG. 1B were semantic object 200. Then text segments 116-1 would include those text segments from among text segments 102 that ML classifier 112 classified as corresponding to semantic object 200. In turn, attribute classifier 116-1 may associate words in the text segments 116-1 with attributes of semantic object 200. For example, if the text segment "Company's interest expense sharply increased from USD 418 million", the attribute classifier 116-1 may associate the text "Company's" with the "owner" attribute, the text "interest expense" with the "entity" attribute, the text "sharply" with the "modifier" attribute, the text "increased" with the "verb" attribute, and the text "from USD 418 million" with the "value" attribute. In some embodiments, to associate text in a text segment with an attribute of a semantic object, a set of features may be extracted from the text and the set of features may be provided as input to an attribute classifier whose output may be one of the attributes of the semantic object. For example, in some embodiments, to associate a word in the text segment with an attribute of a semantic object: (1) the same set of features may be obtained for the word, its immediately preceding word in the text segment, and the following word in the text segment resulting in three sets of features; (2) the three sets of features may be provided as input to an attribute classifier; and (3) the output of the attribute classifier may provide an indication of the attribute with which to associate the word. Although in this example, features are computed for a particular word and the words immediately preceding and following the particular word, this is not a limitation of the technology described herein. When creating a feature vector for a particular word in a text segment for providing as input to an attribute classifier, the feature vector may include features computed for any suitable number (e.g., 0, 1, 2, 3, 4, 5, etc.) of words preceding the particular word in the text segment and/or any suitable number (e.g., 0, 1, 2, 3, 4, 5, etc.) of words following the particular word in the text segment.

Non-limiting examples of features that may be computed for a particular word (e.g., "Company's") include the word in lowercase (e.g., "company's"), the word without its last three characters (e.g., "Compan"), the word without its last two characters (e.g., "Company"), an indication if each letter in the word is capitalized (e.g., "false," because only the first letter of "Company's" capitalized), an indication of whether only the first letter is capitalized (e.g., "true"), an indication of whether the word is a digit or a number (e.g., "false"), and information specifying the part of speech (POS) for the word (e.g., "noun").

The ML classifier 112 may be trained in any suitable way. For example, in some embodiments, the ML classifier 112 may be trained, in a supervised manner, from a set of labeled text segments to classify text segments as being associated with one of N (where N is an integer greater than or equal to 1) semantic objects or none of them. For example, the training may be performed from a set of labeled text segments in which the label for a particular labeled text segment indicates either the semantic object to which the text segment correspond or that the text segment does not correspond to any semantic object. The labels may be obtained in any suitable way. For example, the labels may be derived manually in some embodiments. As another example, the labels may be derived automatically by a different classifier and manually corrected. In some embodiments, the training set of labeled text segments may include tens or hundreds of thousands of text segments (e.g., between 100,000 and 300,000 labeled sentences).

The semantic objects and their attributes are defined prior to training, for example, by using manual and/or automated analysis of a small pilot set of data (e.g., tens of thousands of text segment examples) which may be smaller than the text segments 102 (e.g., hundreds of thousands of examples).

The training data may be organized in any suitable data structure(s) and may be in any suitable format. For example, in some embodiments, each labeled text segment may be indexed, such that the training data includes, for each text segment, an index, the string representing the alphanumeric characters of the text segment, and the label for the text segment (e.g., either identifying a particular semantic object or that the text segment is "noise" because it doesn't correspond to any semantic object). An example is shown in Table 1 below.

TABLE 1

Example of training data for ML classifier 112

| Index | Text Segment | Target Label |
|---|---|---|
| Integer | String | Object or Noise (Char) |

ML classifier 112 may be trained using in any suitable training algorithm. In some embodiments, where the ML classifier is a bi-directional LSTM model, the bi-directional LSTM model may be trained using gradient descent type methods, for example, by using the Adam optimizer (or any other suitable optimizer) with a suitable number of epochs and with a suitable number of batches. For example, in some embodiments, the bi-directional LSTM may include 64 neurons, and may be trained from 200,000 labeled text segments using 200 epochs and 256 batches.

The attribute classifiers 116-1, 116-2, . . . , 116-N, may be trained in any suitable way. In some embodiments, each of the attribute classifiers is trained using a set of labeled text segments with each of one or more words in the text segment being labeled with a label indicating the associated semantic object attribute. For example, features may be obtained for each word labeled with a corresponding semantic object attribute, and the resulting (feature, label) pairs may be used to train an attribute classifier. For example, the training data for a particular word in a text segment may include a set of features for the particular word and the immediately preceding and following words in the text segment. An example is shown in Table 2 below.

TABLE 2

Example of training data for an attribute classifier (e.g., classifier 116-1)

| Word index in Text Segment | Word | Word +1 | Word −1 | Target Label |
|---|---|---|---|---|
| Integer | Features | features | features | Semantic Object Attribute |

An attribute classifier may be trained using in any suitable training algorithm. In some embodiments, where the attribute classifier is a conditional random field classifier, the model may be trained using any suitable optimization method. In some embodiments, the training may be performed using the LBFGS optimizer with L1 and L2 constraints.

An illustrative non-limiting example of the output of an attribute classifier is shown in Table 3 below for a semantic object having attributes of "Root entity", "verb" or "V", "date", "value". The tag "I" is used to tag words not associated with any attribute of the semantic object. In Table 3, the origin column shows an input sentence, the "pred" column provides a tag prediction for each word in the input sentence, and the "truth" column shows the ground truth tag for each word in the input sentence. The divergence column shows that, in this example, there are no errors in the predictions made by the trained CRF model when compared against the ground truth.

TABLE 3

Illustrative output of a CRF attribute classifier and corresponding ground truth

| I | ROOT+entity | V | Value | diverge | origin | pred | truth |
|---|---|---|---|---|---|---|---|
| ['for', 'non-technology', 'integration', 'consulting', 'and'] | ['outsourcing'] | ['contracts'] | | 0 | ['accenture_extractoins.not8917', 'For non-technology integration consulting and outsourcing contracts/DescribeVariation<outsourcing, ROOT+entity><outsourcing, entity><contracts,V>\n'] | ['I', 'I', 'I', 'I', 'I', 'ROOT+ entity', 'V'] | ['I', 'I', 'I', 'I', 'I', 'ROOT+ entity', 'V'] |
| ['service', 'or', '146.0', '%'] | ['revenues'] | ['increased'] | ['usd', '31.3', 'million', ',', 'to', '52.8'] | 0 | ['brooks. not \t164', 'Service revenues increased USD 31.3 million, or 146.0%, to USD 52.8 million/DescribeVariation<revenues,ROOT+entity><Service revenues,entity><increased,V><USD 31.3 million,value><or,CONJ><146.0%,value><\\, to USD 52.8 million,value>\n'] | ['I', 'ROOT+ entity', 'V', 'value', 'value', 'value', 'value', 'I', 'I', 'I', 'value', 'value', 'value', 'value',] | ['I', "ROOT+ entity', 'V', 'value', 'value', 'value', 'value', 'I', 'I', 'I', 'value', 'value', 'value', 'value',] |
| ['the', 'majority', 'of', 'our', 'personnel', ','] | ['compensation'] | ['increases'] | | 0 | ['accenture_extractions.not6794', 'For the majority of our personnel, compensation increases for fiscal 2012/DescribeVariation<compensation,ROOT+entity><compensation,entity><increases,V><for fiscal 2012,date>\n'] | ['I', 'I', 'I', 'I', 'I', 'I', 'I', 'ROOT+ entity', 'V', 'date', 'date', 'date',] | ['I', 'I', 'I', 'I', 'I', 'I', 'I', 'ROOT+ entity' , 'V', 'date', 'date', 'date',] |

It should be appreciated that the NLG DKLS 104 is illustrative and that there are variations. For example, in the illustrative NLG DKLS 104 there is a single ML classifier 112 for classifying input text segments as corresponding to one of multiple semantic objects or as not corresponding to any of them. However, in other embodiments, multiple ML classifiers may be used instead of the single ML classifier 112 (e.g., an initial classifier to separate text segments that do not correspond to any semantic objects from those text segments that do, followed by one or more classifiers to associate text segments to particular semantic objects), as aspects of the technology described herein are not limited in this respect. As another example, in the illustrative NLG DKLS 104, a separate attribute classifier 116 is trained for each semantic object. However, in other embodiments, a single attribute classifier may be trained to recognize attributes from multiple semantic objects, as aspects of the technology described herein are not limited in this respect.

Figure 1C:
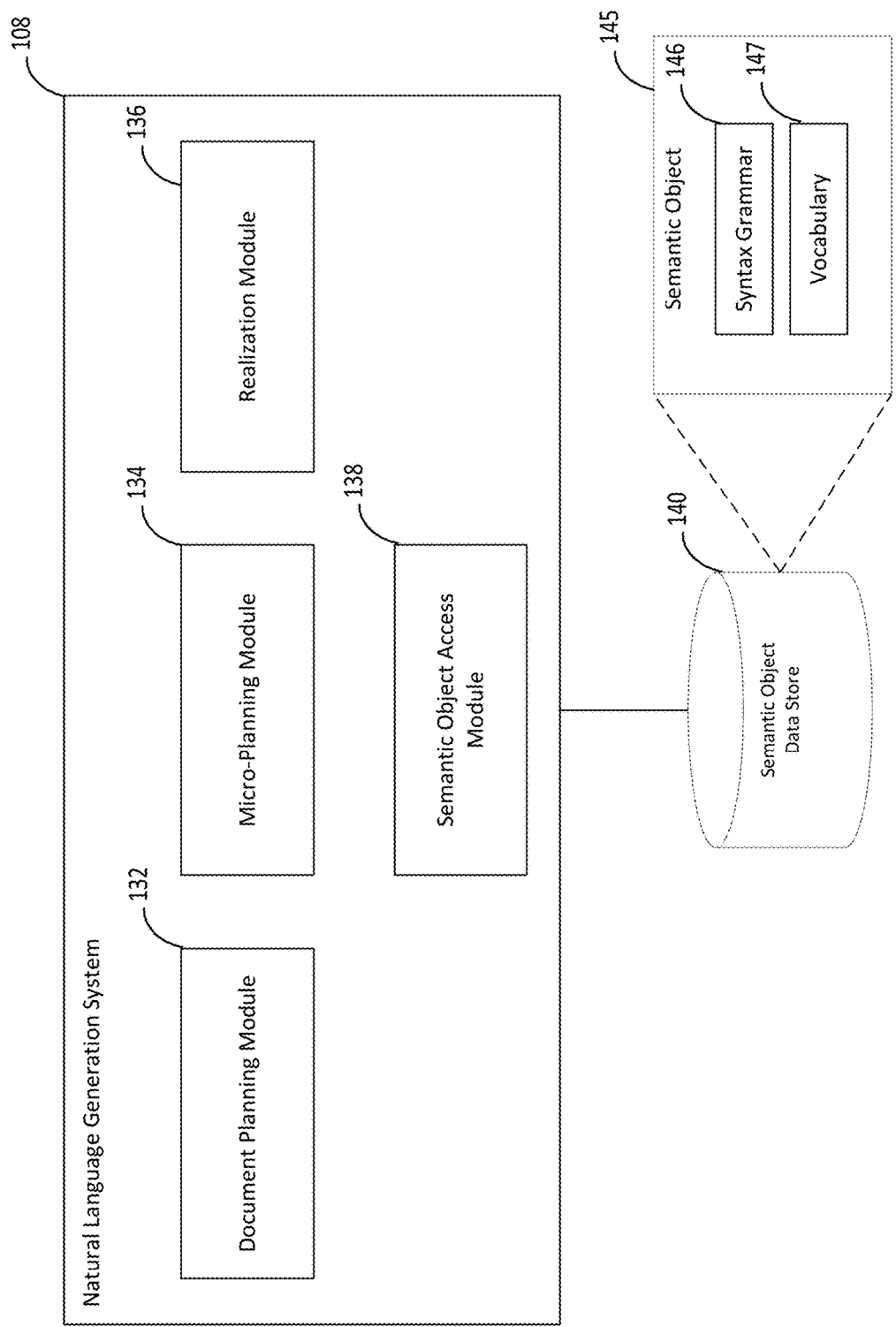
FIG. 1C is a diagram of example components of an illustrative NLG system 108, in accordance with some embodiments of the technology described herein.

FIG. 1C is a diagram of example components of an illustrative NLG system 108, in accordance with some embodiments of the technology described herein. Illustrative NLG system 108 includes document planning module 132, micro-planning module 134, realization module 136, and semantic object access module 138 configured to access information about semantic objects in semantic object data store 140 (which may be part of NLG system 108 or may be remote from, but communicatively coupled to, NLG system 108, for example via a network).

In some embodiments, NLG system 108 may be configured to transform information in a non-linguistic form into human language text using multiple stages of processing including a document planning stage (e.g., implemented using processor executable instructions part of document planning module 132), a micro-planning stage (e.g., implemented using processor executable instructions part of micro-planning module 134), and a realization stage (e.g., implemented using processor executable instructions part of realization module 136).

In some embodiments, the document planning stage of natural language generation, implemented by document planning module 132, may include: (1) a content determination stage during which an NLG system may obtain content to be expressed in natural language text; and (2) a document structuring stage for determining the rhetorical structure of the text to be generated during which the NLG system may generate a document plan indicating how the obtained content is to be organized for presentation in the natural language text to be generated. For example, to generate natural language text about the weather, information about the weather may be obtained in the content determination stage (e.g., information indicating the temperature and information indicating the likelihood of rain) and organized for presentation in the document structuring stage (e.g., by determining that information indicating the likelihood of rain should be presented before information indicating the temperature).

In some embodiments, the document planning stage may be implemented at least in part by using one or more semantic objects (e.g., using one or more semantic objects obtained using semantic object access module 138). In some embodiments, a semantic object includes a set of attributes in a specified order, and each of one or more of the attributes may be associated with a vocabulary (e.g., vocabulary learned using NLG DKLS 104 or obtained in any other suitable way) to render the attribute into a corresponding textual value. During the document planning stage, the NLG system 108 may determine to generate a sentence based on a particular semantic object. The particular semantic object may be used to determine the structure for the sentence—the sentence may be structured to have content corresponding to attributes of the semantic object. The order of such content may be determined in the document planning stage and/or later in the linguistic realization stage described below, and may be determined based on the order of the attributes of the semantic object.

The micro-planning stage of NLG, implemented by micro-planning stage 134, may involve determining, based at least in part on the document plan, a syntactic structure for the text to be generated. The micro-planning stage may include an aggregation stage, a lexicalization stage, and a referring expression stage. The aggregation stage may involve determining boundaries between sentences. The lexical choice stage may involve choosing words to describe particular concepts to be expressed in the text to be generated (e.g., determining whether "warm" or "hot" should be used to describe a temperature of 80 degrees). In some embodiments, vocabularies for semantic objects may be used to perform the lexical choice stage for sentences generated based on semantic objects. For example, the lexical choice stage may be performed by substituting each attribute in the sentence with a corresponding vocabulary word (or words) from the vocabulary for the attribute. The referring expression stage may involve selecting expressions, for use in the text to be generated, to refer to concepts that appear more than once in the text (e.g., selecting the pronoun "it" to refer to "the weather" in a portion of the text to be generated).

The realization stage of NLG may involve transforming the syntactic structure of the document to be generated into text and may include a linguistic realization stage and a structural realization stage. The linguistic realization stage may involve generating actual text according to rules of syntax, morphology, and orthography, and may include putting words in order (e.g., in a manner consistent with the order of attributes in a semantic object for sentences being generated based on a semantic object), conjugating verbs, ensuring adjective-noun agreement, etc. During the structural realization stage, the text generated in the linguistic realization stage may be output in a desired format (e.g., a PDF file, an XML file, etc.). The above-described tasks may be performed by an NLG system sequentially in stages or in any other suitable way.

In the illustrative embodiment of FIG. 1C, semantic object data store 140 may store semantic objects. The semantic object data store 140 may store any suitable number of semantic objects and may store them in any suitable way (e.g., using any suitable data structure(s) and format), as aspects of the technology described herein are not limited in this respect. The data store 140 may be implemented as a database system (e.g., a relational database system), a flat text file, a spreadsheet, or in any other suitable way. In some embodiments, the NLG system 108 may access one or more semantic objects stored in data store 140 to generate natural language text. In some embodiments, the NLG DKLS system 104 may be configured to store semantic objects and/or vocabulary identified by the NLG DKLS 104 for semantic objects in the data store 140.

Figure 1D:
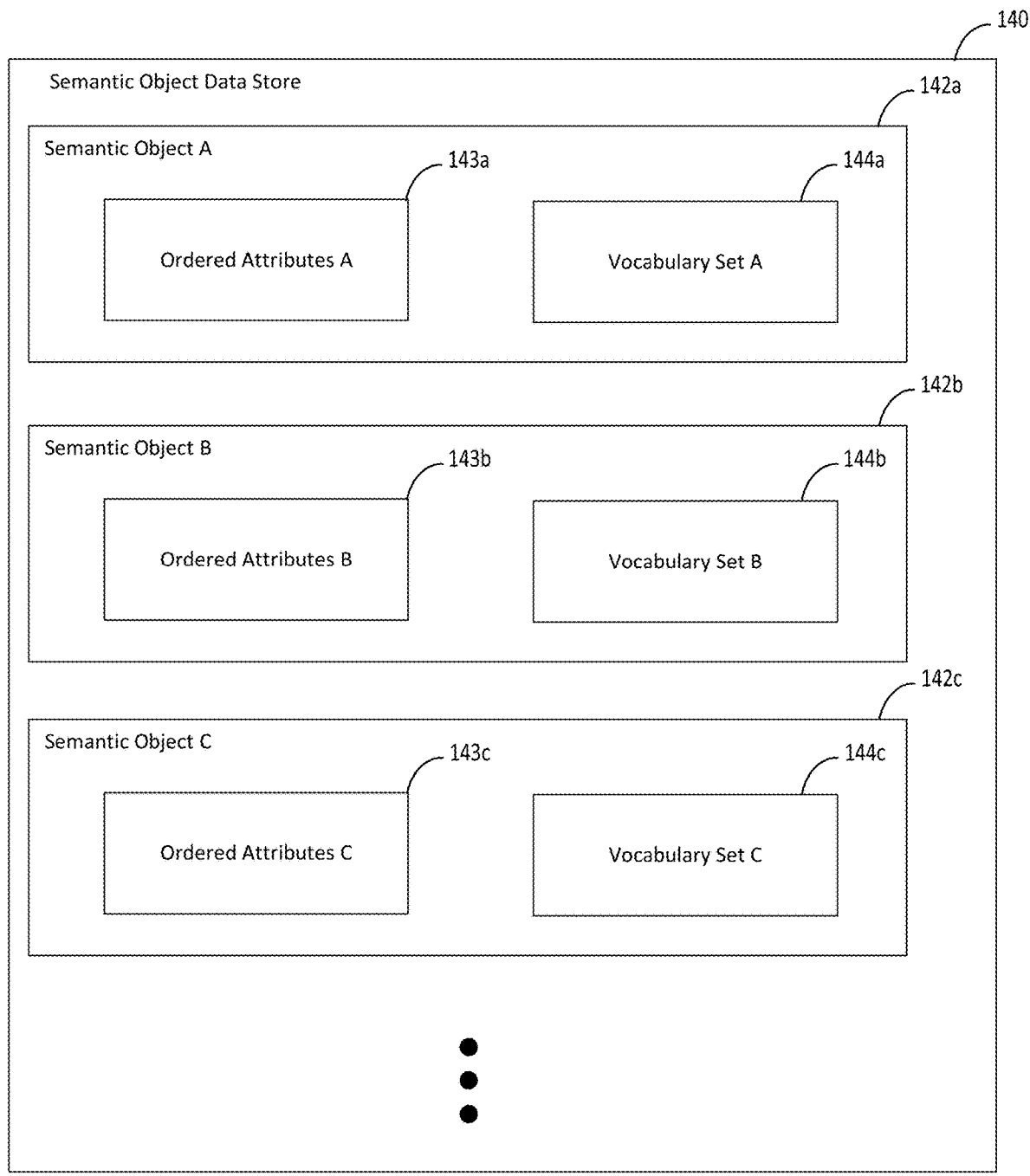
FIG. 1D is a diagram of an illustrative semantic object data store 140, in accordance with some embodiments of the technology described herein.

Each of at least some of the semantic objects in data store 140 may include a syntax grammar and an associated vocabulary. For example, data store 145 may store semantic object 145 that includes a syntax grammar 146 and vocabulary 147. In some embodiments, the syntax grammar may specify a set of one or more attributes for the semantic object and an order for the attributes. For example, as shown in FIG. 1D, data store 140 may store semantic objects 142*a*, 142*b*, and 142*c*, and for each of these semantic objects store information specifying a respective set of ordered attributes 143*a*, 143*b*, and 143*c*, and respective vocabularies 144*a*, 144*b*, and 144*c*, used to realize the attributes. Additionally, in some embodiments, the syntax grammar may specify, for each of one or more attributes, whether the attribute is required, optional, or forbidden. Examples of semantic object attributes are provided herein including the additional examples provided with respect to Table 4 below.

Table 4 shows five example semantic objects, which may be used for generating natural language text in the financial domain. The semantic objects are called "Describe Value", "Describe Variation", "Describe Variation Contributors", "Describe Contribution in Relation", and "Compare Value with Reference". It should be appreciated that these semantic objects are illustrative and that one or more other semantic objects may be used instead of or in addition to the five example semantic objects shown in Table 4 below, as aspects of the technology described herein are not limited in this respect.

TABLE 4

Attributes for five example semantic objects for generating natural language text in financial domain applications. Required attributes are marked with "+". Forbidden attributes are marked with "−", and optional attributes are marked with "+/−". The attributes are described in more detail below.

| Semantic Object Attributes | Describe Value | Describe Variation | Describe Variation Contributors | Describe Contribution In Relation | Compare Value With Reference |
| --- | --- | --- | --- | --- | --- |
| Owner | +/− | +/− | +/− | +/− | +/− |
| Entity | + | + | + | + | + |
| Value | + − + | +/− | +/− | +/− | +/− |
| Modifier | − + + | +/− | +/− | +/− | +/− |
| Specific predicate | − | + − | + − | +/− | + |
| Variation Orientation | − | − + | − + | − | − |
| Date | +/− | +/− | +/− | +/− | +/− |
| Duration | − | +/− | +/− | − | − |
| Contributor | − | − | + | − | − |
| Reference | − | − | − | − | + |
| Contribution | − | − | − | + | +/− |

The attributes shown in Table 4, in some embodiments, may take on values as described next.

- In some embodiments, a value of the "owner" attribute may be text (e.g., "Company's") specifying a business entity (e.g., a company, a subsidiary, etc.) to which the "entity" relates.
- In some embodiments, a value of the "entity" attribute may be text (e.g., "gross profit") describing a financial indicator and/or a measurable quantity about a business.
- In some embodiments, a value of the "modifier" attribute may be text (e.g., "slowly", "sharply", etc.) describing an adjective or an adverb. In some embodiments, a value of the "verb" attribute may be any suitable verb (e.g., "increased", "decreased", "changed", etc.).
- In some embodiments, a value of the "value" attribute may be text indicating a measurement of the "entity" (e.g., "from USD 418 million", "less than 30 percent", etc.).
- In some embodiments, a value of the "date" attribute may be text specifying a date when the value in the sentence was described (e.g., Nov. 20, 2012), and may have any suitable date format.
- In some embodiments, a value of the "duration" attribute may be text specifying a period of time (e.g., from a starting date and/or time to an ending date and/or time) in which the entity was observed, and may have any suitable format.
- In some embodiments, a value of a "specific predicate" may be text specifying a verbal predicate for the semantic object.
- In some embodiments, a value of a "variation orientation" attribute may be text indicating the orientation of an entity's variation (e.g., whether it increases or decreases) over a time period. It may be a noun, a superlative, or a preposition. Verbs indicating the orientation of a variation are not considered to be "variation orientation" attributes; rather they are considered to be "specific predicate" attributes.
- In some embodiments, a value of a "contributor" attribute may be text identifying the contributor to an entity's variation. It can be a VariationOrientation, an entity, or the combination of both elements, as well as an owner. For example, in the sentence, "Procurement participated 30% in the annual revenue of the Company", the term "Procurement" is an example value contributor attribute because it describes something that contributes to the annual revenue. As another example, in the sentence, "Cost of services is primarily drive by the cost of labor", the term "cost of labor" is a an example value of a contributor attribute because it describes something that contributes to the cost of services.
- In some embodiments, a value of the "reference" attribute may be text describing an entity used as a reference for the comparison in the "Compare Value With Reference" semantic object. For example, in the sentence, "Annual revenue increased 7% in 2020 compared to 2019 annual revenue", the value "7%" is compared to another term "2019 annual revenue" considered to be a value of the reference attribute. As another example, in the sentence, "For fiscal year 2017 compared to fiscal year 2016, sales and marketing costs as a percentage of net revenues decreased 10 basis points", the term "fiscal year 2016" is a value of the reference attribute, "10 basis points" is the value of the value attribute, and "marketing costs" is the value of the entity attribute.
- In some embodiments, a value of the "contribution" attribute may be composed of several sub-entities. For example, "annual income is composed of 13% of xx revenue and 5% xx revenue". For example, in the sentence "The reduction in gross margin for fiscal 2016 was principally due to higher labor costs and higher costs associated with acquisition activities", both "higher labor costs" and "higher costs associated with acquisition activities" are values of two sub-entities of the "contribution" attribute.

The following examples include an example for each of the semantic objects described in Table 4.

Example 1: "CompareValueWithReference" Semantic Object

Text segment matching the semantic object: "For fiscal 2017 compared to fiscal 2016, Sales and marketing costs as a percentage of net revenues decreased 10 basis points"

Breakdown into attribute values and tags:
  <For fiscal 2017,date>
  <compared,V+PP>
  <to fiscal 2016\,,date>
  <to fiscal 2016\,,Reference>
  <Sales and marketing costs,ROOT+entity>
  <Sales and marketing costs as a percentage of net revenues,entity>
  <decreased,V>
  <10 basis points,value>

Example 2: "DescribeContributionInRelation" Semantic Object

Text segment matching the semantic object: "Consulting net revenues, which include strategy, management and technology consulting"
Breakdown into attribute values and tags:
  <Consulting,ROOT+entity>
  <net revenues,ROOT+entity>
  <Consulting net revenues,entity>
  <which,PRO>
  <include,V>
  <strategy\,management,DIM+entity>
  <technology,DIM+entity>
  <consulting,ROOT+entity>
  <strategy\, management and technology consulting, entity>

Example 3: "DescribeVariationContributors" Semantic Object

Text segment matching the semantic object: "Cost of services is primarily driven by the cost of client"
Breakdown into attribute values and tags:
  <Cost of services,ROOT+entity>
  <Cost of services,entity>
  <is,V+AUX>
  <primarily,ADV>
  <driven,V>
  <by,PREP>
  <the,DET>
  <cost,ROOT+entity>
  <cost of client,entity>
  <the cost of client,Contributor>

Example 4: "DescribeVariation" Semantic Object

Text segment matching the semantic object: "Based on current and projected future demand, we have increased our headcount."
Breakdown into attribute values and tags:
  <we,PRO+Owner>
  <have,V+AUX>
  <increased,V>
  <our,DET>
  <headcount,ROOT+entity>
  <headcount,entity>

Example 5: "DescribeValue" Semantic Object

Text segment matching the semantic object: "During fiscal 2016, we recorded a USD 548 million gain on sale of business."
Breakdown into attribute values and tags:
  <During fiscal 2016\,,date>
  <we,PRO+owner>
  <recorded,V>
  <a,DET>
  <USD 548 million,value>
  <gain on sale of business,ROOT+entity>
  <gain on sale of business,entity>

Figure 3:
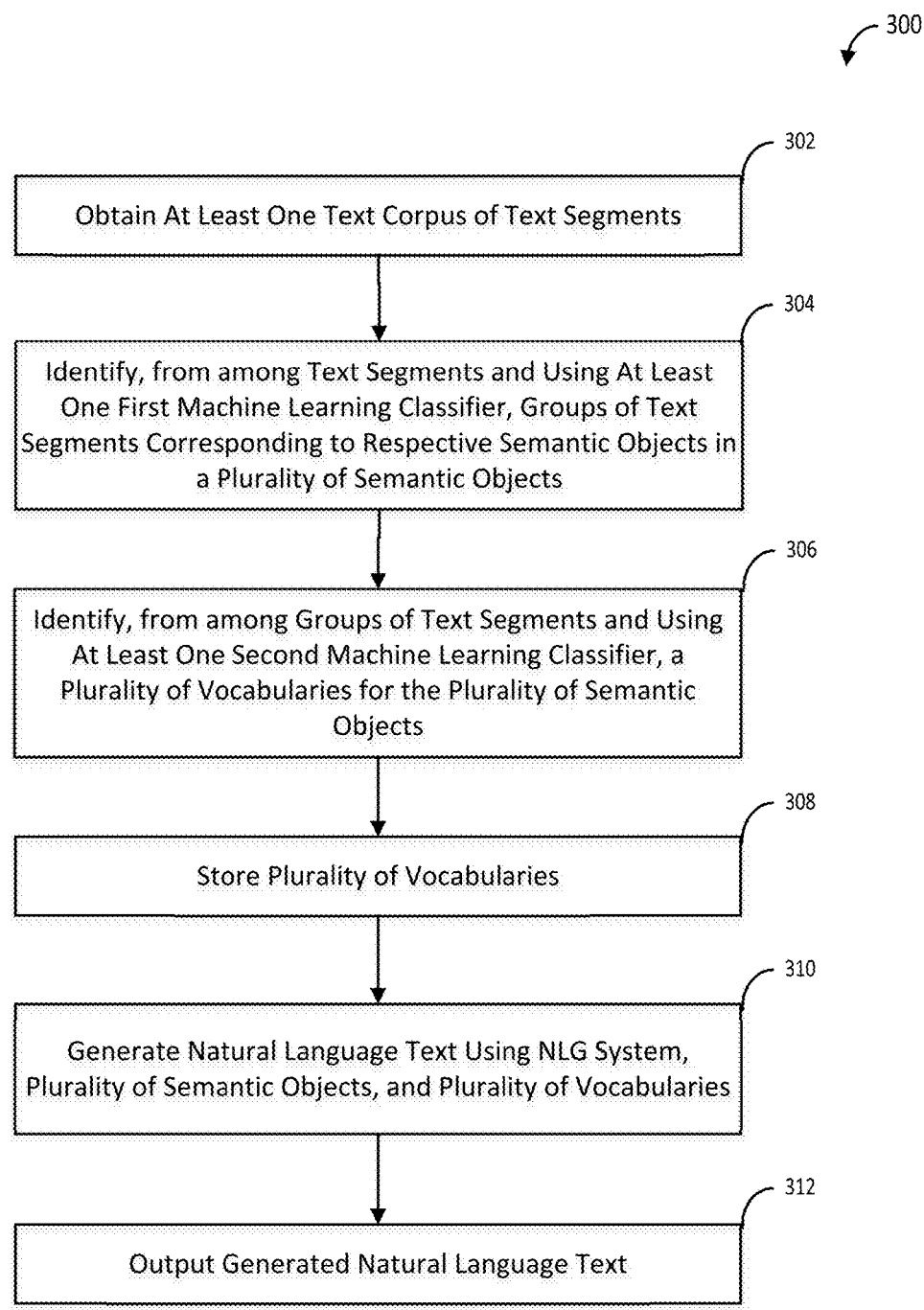
FIG. 3 is a flowchart of an illustrative process 300 of identifying a respective vocabulary for each of one or more semantic objects and generating natural language text using the identified vocabularies, in accordance with some embodiments of the technology described herein.

FIG. 3 is a flowchart of an illustrative process 300 of identifying a respective vocabulary for each of one or more semantic objects and generating natural language text using the identified vocabularies, in accordance with some embodiments of the technology described herein. The process 300 may be performed by any suitable computing device(s). In some embodiments, the process 300 may be performed by NLG DKLS 104 and NLG system 108. In some embodiments, the process 300 may be performed entirely by an NLG system, as aspects of the technology described herein are not limited in this respect.

Process 300 begins at act 302, where at least one text corpus of text segments is obtained. The text corpus may have any suitable number of text segments, examples of which number are provided herein. The text corpus may be obtained from any suitable source(s), examples of which are provided herein.

Next, process 300 proceeds to act 304, where at least one first machine learning classifier is applied to the text segments obtained at act 302 in order to identify groups of segments corresponding to respective objects in a plurality of semantic objects. In some embodiments, the at least one first machine learning classifier may include multiple classifiers. In other embodiments, the at least one first machine learning classifier consists of a single classifier. Examples of the classifier(s) that may be used at act 304 are provided herein and include, by way of example and not limitation, a neural network classifier (e.g., an LSTM classifier). In some embodiments, act 304 may be performed by NLG DKLS 104 and the at least one first machine learning classifier may be ML classifier 112 described herein including with reference to FIG. 1B. In some such embodiments, the groups of segments generated at act 304 may be text segment groups 114-1, 114-2, . . . , 114-N, and 115.

Next, process 300 proceeds to act 306, where at least one second machine learning classifier is used to identify a plurality of vocabularies for the plurality of semantic objects from among the groups of text segments identified at act 304. In some embodiments, the at least one second machine learning classifier may include multiple classifiers. For example, the at least one second machine learning classifier may include a respective classifier for each of the plurality of semantic objects. In other embodiments, the at least one second machine learning classifier consists of a single classifier. Examples of the classifier(s) that may be used at act 306 are provided herein and include, by way of example and not limitation, a conditional random field classifier. In some embodiments, act 306 may be performed by NLG DKLS 104 and the at least one second machine learning classifier may include attribute classifiers 116-1, 116-2, . . . , 116-N described herein including with reference to FIG. 1B. In some such embodiments, the groups of segments generated at act 304 may be text segment groups 114-1, 114-2, . . . , 114-N, and 115.

In some embodiments, the application of the at least one second classifier to the groups of text segments identified at act 304 may produce tagged text segment groups (e.g., groups 118-1, 118-2, . . . , 118-N). In turn, the tagged text segment groups may be used to identify vocabularies (e.g., 120-1, 120-2, . . . , 120-N) for the semantic objects, which may be done in any suitable way including in any of the ways described above with reference to FIG. 1B.

Next, process 300 proceeds to act 308, where the vocabularies generated at act 306 are stored. In some embodiments, the vocabularies may be stored in any data store that may be subsequently accessed by an NLG system (e.g., NLG system 108) to use for generating natural language text. For example, the vocabularies generated at act 306 may be stored in semantic object data store 140.

In some embodiments, process 300 concludes after act 308, with the vocabularies for semantic objects being stored for subsequent use in generating natural language text. In other embodiments, including the illustrative embodiment of FIG. 3A, process 300 continues to acts 310 and 312, where the vocabularies identified at act 306 to generate and output natural language text.

Accordingly at act 310, an NLG system (e.g., NLG system 108) is configured to generate natural language text using at least some of the plurality of semantic objects and vocabularies for the at least some of the plurality of semantic objects. This may be done in any suitable way including in any of the ways described herein with reference to FIG. 1C.

Next, at act 312 the generated natural language text may be output. This may be done in any suitable way. For example, the generated natural language text may be inserted into an electronic document (e.g., a report, a text file, an e-mail, and/or any other electronic document). As another example, the generated natural language text may be presented to a user through a graphical user interface (e.g., in a webpage or web application accessible through an Internet browser, a GUI of an app executing on the user's mobile device, in a window of a chatbot web application with which the user is interacting, etc.).

Figure 4A:
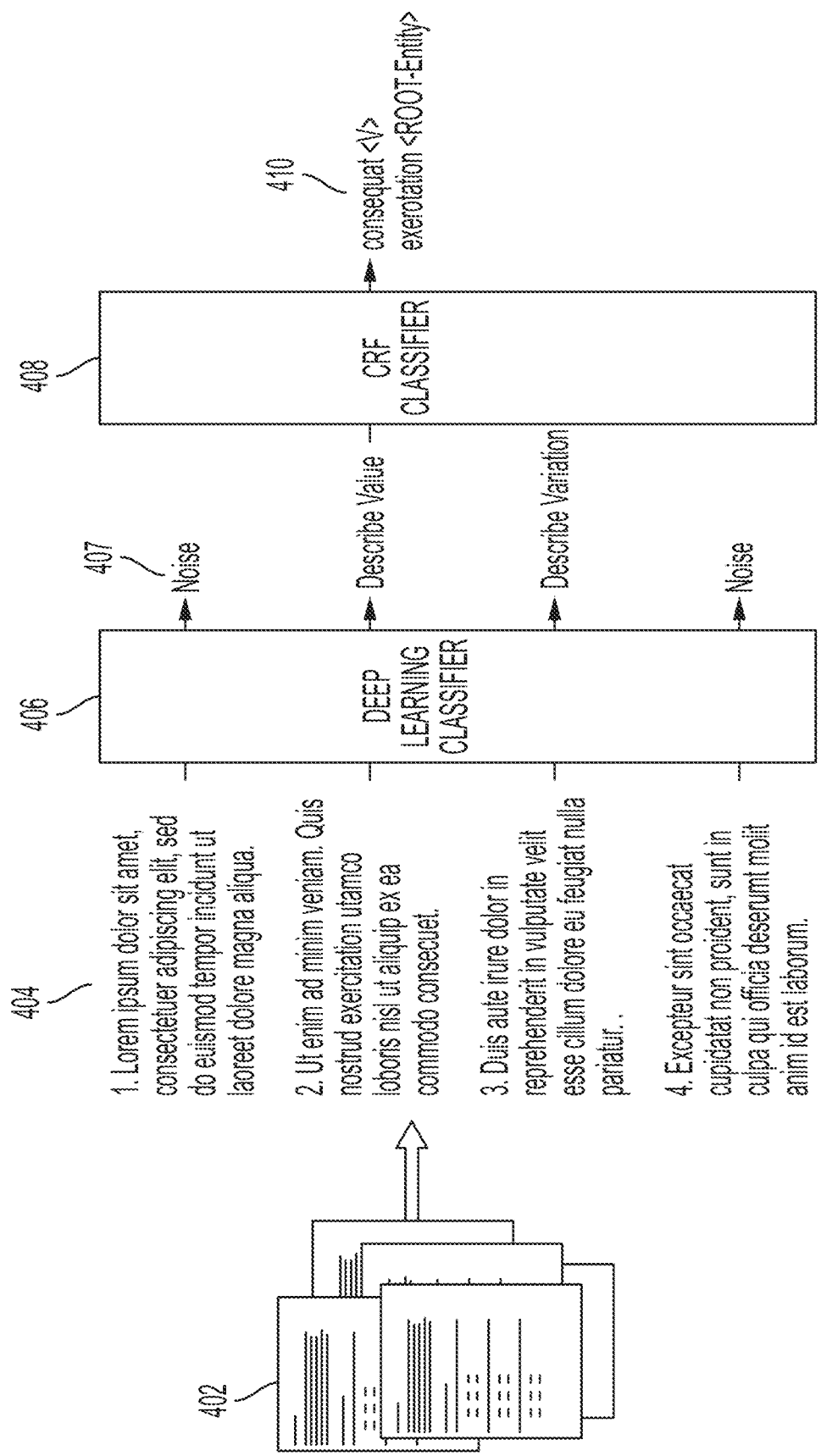
FIG. 4A is a diagram of an illustrative NLG domain knowledge learning system, in accordance with some embodiments of the technology described herein.
Figure 4B:
FIG. 4B illustrates multiple vocabularies learned for a same semantic object using text corpora obtained from different businesses, in accordance with some embodiments of the technology described herein.

FIG. 4A is a diagram of another illustrative NLG domain knowledge learning system, in accordance with some embodiments of the technology described herein. The NLG DKLS of FIG. 4A is configured to apply a deep learning classifier 406 (e.g., an LSTM) to sentences 404 obtained from multiple documents 402 (e.g., financial reports, e-mails, etc.). The output 407 of the deep learning classifier 406 indicates, for each of the input sentences, either a semantic object to which the sentence corresponds or that the sentence does not correspond to any semantic object that the deep learning classifier 406 is trained to recognize. In the example of FIG. 4A, output 407 indicates that sentence 2 corresponds to the "Describe Value" semantic object and that sentence 3 corresponds to the "Describe Variation" semantic object. Output 407 further indicates that sentences 1 and 4 do not correspond to any semantic object that the deep learning classifier 406 is trained to recognize.

Next, the sentences 2 and 3, which were found as corresponding to a semantic object, are subsequently processed by respective CRF classifiers to identify words in the sentences that correspond to semantic object attributes. As shown in FIG. 4A, for example, the sentence 2 is processed by CRF classifier 408 trained to associate words in input sentences with attributes of the semantic object "Describe Value". A portion of the tagged sentence 410 is shown at the output of CRF classifier 408.

FIG. 4B illustrates multiple vocabularies learned for the same semantic object using text corpora obtained from different businesses, in accordance with some embodiments of the technology described herein. As described herein, an NLG DKLS (e.g., NLG DKLS 104) may learn different vocabularies for the same semantic object attribute, when the learning is performed on documents used by different companies or in different industries. For example, an NLG DKLS may learn the vocabulary used by different companies and/or industries for the "verb" attribute of the semantic object "Describe Variation". The results of one such experiment are shown in FIG. 4B, which includes a list of verbs 420 learned for the "verb" attribute by NLG DKLS 104 from documents of company A and another list of verbs 430 learned for the same attribute by NLG DKLS 104 from documents of company B. It is readily apparent that company's A and B use different verbs to describe similar concepts and, even when the same verbs are used, the company's do not prefer to use them with the same frequency, indicating different word choice preferences. This example clearly shows that learning semantic object vocabularies from documents for a particular business or industry using the techniques developed by the inventors and described herein enables an NLG system to generate natural language text customized to the business or industry.

Figure 5:
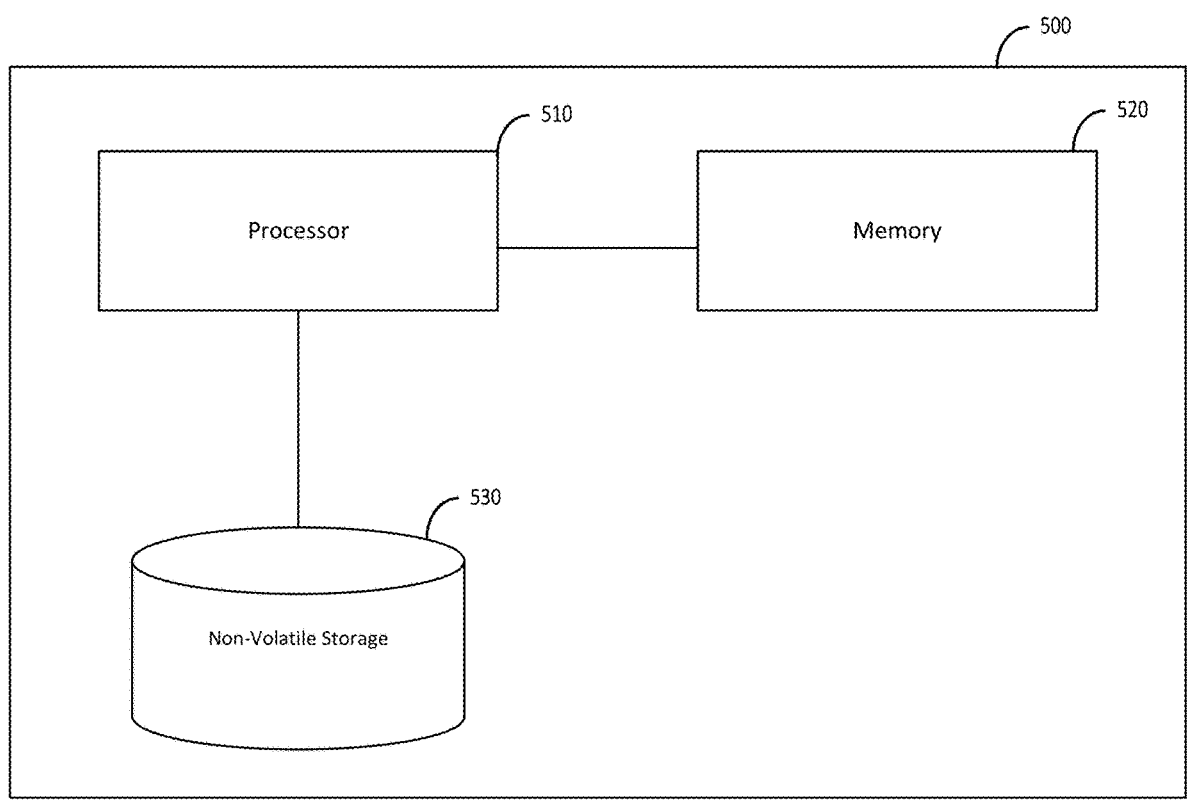
FIG. 5 is a block diagram of an illustrative computer system that may be used in implementing some embodiments of the technology described herein.

An illustrative implementation of a computer system 500 that may be used in connection with any of the embodiments of the disclosure provided herein is shown in FIG. 5. The computer system 500 may include one or more processors 510 and one or more articles of manufacture that comprise non-transitory computer-readable storage media (e.g., memory 520 and one or more non-volatile storage media 530). The processor(s) 510 may control writing data to and reading data from the memory 520 and the non-volatile storage device 530 in any suitable manner, as the aspects of the technology described herein are not limited in this respect. To perform any of the functionality described herein, the processor(s) 510 may execute one or more processor-executable instructions stored in one or more non-transitory computer-readable storage media (e.g., the memory 520), which may serve as non-transitory computer-readable storage media storing processor-executable instructions for execution by the processor(s) 510.

The terms "program" or "software" are used herein in a generic sense to refer to any type of computer code or set of processor-executable instructions that can be employed to program a computer or other processor to implement various aspects of embodiments as described herein. Additionally, in some embodiments, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided including with reference to FIG. 3. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "substantially", "approximately", and "about" may be used to mean within ±20% of a target value in some embodiments, within ±10% of a target value in some embodiments, within ±5% of a target value in some embodiments, within ±2% of a target value in some embodiments. The terms "approximately" and "about" may include the target value.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for identifying vocabulary associated with a plurality of semantic objects used for generating natural language text with a natural language generation (NLG) system, the plurality of semantic objects including a first semantic object having a first set of ordered attributes and second semantic object having a second set of ordered attributes, the method comprising:
   using at least one computer hardware processor to perform:
      obtaining at least one text corpus comprising a plurality of text segments;
      identifying, from among the plurality of text segments and using at least one first machine learning classifier, groups of text segments corresponding to respective semantic objects in the plurality of semantic objects, the groups of text segments including a first group of text segments corresponding to the first semantic object and a second group of text segments corresponding to the second semantic object;
      identifying, from the groups of text segments and using at least one second machine learning classifier, a plurality of vocabularies for the plurality of semantic objects, the identifying comprising:
         identifying, using the first group of text segments and the at least one second machine learning classifier, a first vocabulary for the first semantic object, the first vocabulary containing multiple alternative words for each of at least some attributes in the first set of ordered attributes; and
         identifying, using the second group of text segments and the at least one second machine learning classifier, a second vocabulary for the second semantic object, the second vocabulary containing multiple alternative words for each of at least some attributes in the second set of ordered attributes;
      generating natural language text using the NLG system, the plurality of vocabularies, and the plurality of semantic objects, the generated natural language text comprising a first text segment generated using the first semantic object and containing at least some words in the first vocabulary and a second text segment generated using the second semantic object and containing at least some words in the second vocabulary; and
      outputting the generated natural language text.

2. The method of claim 1, further comprising:
   storing, in at least one computer readable storage medium, the plurality of vocabularies and information associating the plurality of vocabularies with the plurality of semantic objects.

3. The method of claim 1, further comprising:
identifying, using the at least one first machine learning classifier, at least some of the plurality of text segments as not corresponding to any of the plurality of semantic objects.

4. The method of claim 1, wherein the at least one first machine learning classifier comprises a neural network classifier.

5. The method of claim 4, wherein the neural network classifier comprises a recurrent neural network.

6. The method of claim 5, wherein the recurrent neural network is a long short-term memory (LSTM) recurrent neural network or a bi-directional LSTM (bi-LSTM) recurrent neural network.

7. The method of claim 1, wherein the at least one first machine learning classifier comprises a hidden Markov model.

8. The method of claim 1, wherein the first group of text segments comprises a first text segment, and wherein identifying the first vocabulary comprises:
determining a first set of feature values for the first text segment;
providing the first set of feature values as input to the at least one second machine learning classifier to obtain a corresponding output,
wherein the output identifies, for each of at least some of the words in the first text segment, at least one corresponding attribute in the first set of ordered attributes.

9. The method of claim 1,
wherein the at least one second machine classifier comprises a third machine learning classifier and a fourth machine learning classifier, wherein the first group of text segments comprises a first text segment, the second group of text segments comprises a second text segment,
wherein identifying the first vocabulary comprises:
determining a first set of feature values for the first text segment;
providing the first set of feature values as input to the third machine learning classifier to obtain a first output that identifies, for each of at least some of the words in the first text segment, at least one corresponding attribute in the first set of ordered attributes, and
wherein identifying the second vocabulary comprises:
determining a second set of feature values for the second text segment;
providing the second set of feature values as input to the fourth machine learning classifier to obtain a second output that identifies, for each of at least some of the words in the second text segment, at least one corresponding attribute in the second set of ordered attributes.

10. The method of claim 8, wherein the first set of feature values include, for each word of one or more words in the first text segment, feature values for features selected from the group consisting of: the word in lowercase, the word without its last three characters, the word without its last two characters, an indication if each letter in the word is capitalized, an indication of whether only the first letter is capitalized, an indication of whether the word is a digit or a number, and information specifying the part of speech (POS) for the word.

11. The method of claim 8, wherein the first of ordered attributes includes attributes selected from the group consisting of: an owner attribute, an entity attribute, a value attribute, a modifier attribute, a specific predicate attribute, a variation orientation attribute, a duration attribute, a contributor attribute, a reference attribute, and a contribution attribute.

12. The method of claim 1, wherein the first vocabulary further includes information specifying at least one frequency of occurrence of at least one of the multiple alternative words in the first group of text segments.

13. The method of claim 1, wherein the second machine learning classifier comprises a graphical model classifier.

14. The method of claim 1, wherein the second machine learning classifier comprises a conditional random field classifier.

15. A system, comprising:
at least one computer hardware processor; and
at least one non-transitory computer-readable storage medium storing processor executable instructions that, when executed by the at least one computer hardware processor, cause the at least one computer hardware processor to perform: a method for identifying vocabulary associated with a plurality of semantic objects used for generating natural language text with a natural language generation (NLG) system, the plurality of semantic objects including a first semantic object having a first set of ordered attributes and second semantic object having a second set of ordered attributes, the method comprising:
obtaining at least one text corpus comprising a plurality of text segments;
identifying, from among the plurality of text segments and using at least one first machine learning classifier, groups of text segments corresponding to respective semantic objects in the plurality of semantic objects, the groups of text segments including a first group of text segments corresponding to the first semantic object and a second group of text segments corresponding to the second semantic object;
identifying, from the groups of text segments and using at least one second machine learning classifier, a plurality of vocabularies for the plurality of semantic objects, the identifying comprising:
identifying, using the first group of text segments and the at least one second machine learning classifier, a first vocabulary for the first semantic object, the first vocabulary containing multiple alternative words for each of at least some attributes in the first set of ordered attributes; and
identifying, using the second group of text segments and the at least one second machine learning classifier, a second vocabulary for the second semantic object, the second vocabulary containing multiple alternative words for each of at least some attributes in the second set of ordered attributes;
generating natural language text using the NLG system, the plurality of vocabularies, and the plurality of semantic objects, the generated natural language text comprising a first text segment generated using the first semantic object and containing at least some words in the first vocabulary and a second text segment generated using the second semantic object and containing at least some words in the second vocabulary; and
outputting the generated natural language text.

16. The system of claim 15, wherein the method further comprising:

identifying, using the at least one first machine learning classifier, at least some of the plurality of text segments as not corresponding to any of the plurality of semantic objects.

17. The system of claim 15, wherein the at least one first machine learning classifier comprises a neural network classifier.

18. At least one non-transitory computer-readable storage medium storing processor executable instructions that, when executed by at least one computer hardware processor, cause the at least one computer hardware processor to perform: a method for identifying vocabulary associated with a plurality of semantic objects used for generating natural language text with a natural language generation (NLG) system, the plurality of semantic objects including a first semantic object having a first set of ordered attributes and second semantic object having a second set of ordered attributes, the method comprising:

obtaining at least one text corpus comprising a plurality of text segments;

identifying, from among the plurality of text segments and using at least one first machine learning classifier, groups of text segments corresponding to respective semantic objects in the plurality of semantic objects, the groups of text segments including a first group of text segments corresponding to the first semantic object and a second group of text segments corresponding to the second semantic object;

identifying, from the groups of text segments and using at least one second machine learning classifier, a plurality of vocabularies for the plurality of semantic objects, the identifying comprising:

identifying, using the first group of text segments and the at least one second machine learning classifier, a first vocabulary for the first semantic object, the first vocabulary containing multiple alternative words for each of at least some attributes in the first set of ordered attributes; and identifying, using the second group of text segments and the at least one second machine learning classifier, a second vocabulary for the second semantic object, the second vocabulary containing multiple alternative words for each of at least some attributes in the second set of ordered attributes;

generating natural language text using the NLG engine, the plurality of vocabularies, and the plurality of semantic objects, the generated natural language text comprising a first text segment generated using the first semantic object and containing at least some words in the first vocabulary and a second text segment generated using the second semantic object and containing at least some words in the second vocabulary; and outputting the generated natural language text.

19. The at least one non-transitory computer-readable storage medium of claim 18, wherein the method further comprising:

identifying, using the at least one first machine learning classifier, at least some of the plurality of text segments as not corresponding to any of the plurality of semantic objects.

20. The at least one non-transitory computer-readable storage medium of claim 18, wherein the at least one first machine learning classifier comprises a neural network classifier.

* * * * *

UNITED STATES PATENT AND TRADEMARK OFFICE
CERTIFICATE OF CORRECTION

PATENT NO. : 11,210,473 B1  
APPLICATION NO. : 16/816475  
DATED : December 28, 2021  
INVENTOR(S) : Dominique Mariko et al.

Page 1 of 1

It is certified that error appears in the above-identified patent and that said Letters Patent is hereby corrected as shown below:

On the Title Page

In item (71) Applicant:
Please replace "Lyons" with --Lyon--

In item (73) Assignee:
Please replace "Lyons" with --Lyon--

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*